(12) United States Patent
Torres et al.

(10) Patent No.: US 12,351,518 B2
(45) Date of Patent: Jul. 8, 2025

(54) COMPOSITIONS AND METHODS FOR PLASTER-BASED THERMAL GROUT

(71) Applicant: Schlumberger Technology Corporation, Sugar Land, TX (US)

(72) Inventors: Hortencia Torres, Pearland, TX (US); Nicolas Droger, Houston, TX (US); Mark Meade, Katy, TX (US); Christopher Parton, Rosenberg, TX (US); Dmitry Kuravskiy, Braintree, MA (US)

(73) Assignee: Schlumberger Technology Corporation, Sugar Land, AS (US)

( * ) Notice: Subject to any disclaimer, the term of this patent is extended or adjusted under 35 U.S.C. 154(b) by 0 days.

(21) Appl. No.: 18/540,358

(22) Filed: Dec. 14, 2023

(65) Prior Publication Data

US 2025/0197287 A1    Jun. 19, 2025

(51) Int. Cl.
| | | |
|---|---|---|
| C04B 28/14 | (2006.01) | |
| C04B 11/26 | (2006.01) | |
| C04B 14/02 | (2006.01) | |
| C04B 14/06 | (2006.01) | |
| C04B 14/10 | (2006.01) | |
| C04B 22/00 | (2006.01) | |
| C04B 24/00 | (2006.01) | |
| C09K 8/467 | (2006.01) | |
| C04B 103/20 | (2006.01) | |

(52) U.S. Cl.
CPC ............. *C04B 28/14* (2013.01); *C04B 11/26* (2013.01); *C04B 14/024* (2013.01); *C04B 14/06* (2013.01); *C04B 14/104* (2013.01); *C04B 22/0013* (2013.01); *C04B 24/003* (2013.01); *C09K 8/467* (2013.01); *C04B 2103/20* (2013.01); *C04B 2201/10* (2013.01); *C04B 2201/20* (2013.01); *C04B 2201/32* (2013.01)

(58) Field of Classification Search
CPC .................................................. C04B 28/082
See application file for complete search history.

(56) References Cited

U.S. PATENT DOCUMENTS

| 4,676,832 | A | * | 6/1987 | Childs | ..................... | C04B 28/02 |
| | | | | | | 106/806 |
| 8,317,916 | B1 | * | 11/2012 | Dongell | .............. | C04B 40/0028 |
| | | | | | | 106/737 |
| 2007/0125274 | A1 | * | 6/2007 | Miller | ..................... | C04B 28/02 |
| | | | | | | 106/638 |
| 2012/0247766 | A1 | * | 10/2012 | Hemmings | ............ | C04B 28/082 |
| | | | | | | 106/710 |

* cited by examiner

*Primary Examiner* — William D Hutton, Jr.
*Assistant Examiner* — Avi T Skaist
(74) *Attorney, Agent, or Firm* — Jeffrey D. Frantz

(57) ABSTRACT

A grout composition includes a grout binder comprising calcium sulfate, the grout binder constituting from about 25.0 weight percent to about 99.0 weight percent of the grout composition, and at least one thermal conductivity additive comprising graphite. A grout formed from the grout composition has a thermal conductivity greater than about 1.0 W/m·K. Related grout slurries formed from the grout composition, grouts, and methods of grouting a wellbore are also disclosed.

15 Claims, 3 Drawing Sheets

COMPOSITIONS AND METHODS FOR PLASTER-BASED THERMAL GROUT

CROSS-REFERENCE TO RELATED APPLICATIONS

N/A

BACKGROUND OF THE DISCLOSURE

Heating and cooling demands of buildings conventionally require the use of electricity, fuel, or both to maintain temperatures within the buildings within a desirable range. For example, to cool a space inside of a building, an air conditioner circulates a refrigerant which exchanges heat with warmer air inside of the building by heat exchange between the refrigerant in an evaporator coil and building air passed over the evaporator coil. The heated refrigerant is passed through a compressor and a condenser coil of a condenser, where it is cooled with external air and then expanded across an expansion valve to further cool the refrigerant. To heat building air, a heater may combust a fossil fuel (e.g., natural gas) to provide heat which is transferred to the building air in a heat exchanger, and then circulated through the ventilation of the building.

Another method of heating and cooling building spaces uses ground source heat pumps (also referred to as "geothermal heat pumps"). A ground source heat pump is a type of heat pump (that uses work to transfer heat from a cool space to a warm space by transferring thermal energy using a refrigeration cycle, cooling the cool space and warming the warm space) using the provide or store thermal energy for respective heating or cooling. For example, at a depth of about 10 meters (about 33 feet), the temperature of the earth is relatively constant (e.g., between about 10° C. (about 50° F.) and about 15° C. (about 59° F.)). Accordingly, the subterranean in some regions of the earth, the earth formation may be cooler than air temperatures in the summer and hotter than air temperatures in the winter.

A geothermal heat pump system may include one or more wellbores extending to a downhole location in the surface of the earth. In some instances, a heat transfer loop is at least partially placed in the earth below the surface of the earth. The heat transfer loop includes a continuous loop of pipe (e.g., a vertical collector, a horizontal collector, a looped collector) is connected to the ground source heat pump. To facilitate heat transfer between the fluid in pipes of the heat transfer loop beneath the surface of the earth, a grout material is placed between the pipes and the earth formation.

The ground source heat pump, typically above the surface of the earth, circulates fluid in the pipes to exchange heat with the surrounding subsurface soil. The fluid exchanges heat in a heat exchanger with building air to provide the desired heating or cooling to the building air. The ground source heat pump may transfer thermal energy (e.g., heat) to and from the ground (the earth) as a means to control the temperature of a building. Because ground source heat pumps utilize the temperature of the earth, ground source heat pumps are more efficient than conventional methods of heating and cooling, which use energy by burning a fuel, using resistive heaters, and/or operating a condenser for a refrigerator cycle.

SUMMARY

In some embodiments, a grout composition comprises a grout binder comprising calcium sulfate, the grout binder constituting from about 25.0 weight percent to about 99.0 weight percent of the grout composition, and at least one thermal conductivity additive comprising graphite.

In some embodiments, a grout slurry composition comprises water, at least one grout binder comprising at least about 50 weight percent calcium sulfate, and at least one thermal conductivity additive comprising graphite, wherein the grout slurry composition has a density less than about 1,450 kg/m$^3$ and a viscosity less than about 1,000 cP at about 25° C.

In some embodiments, a method of grouting a shallow geothermal wellbore comprises pumping a grout slurry in a wellbore extending through an earth formation between surfaces of the earth formation defining the wellbore and a thermal transfer pipe, the grout slurry having a density less than about 1,450 kg/m$^3$, and allowing the grout slurry to set to form a grout having a thermal conductivity greater than about 1.0 W/m·K. The grout slurry comprises water, at least about 25.0 weight percent calcium sulfate dihydrate based on the grout slurry composition not including the water, and at least about 10.0 weight percent graphite based on the grout slurry composition not including the water.

BRIEF DESCRIPTION OF THE DRAWING

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Figure 1:
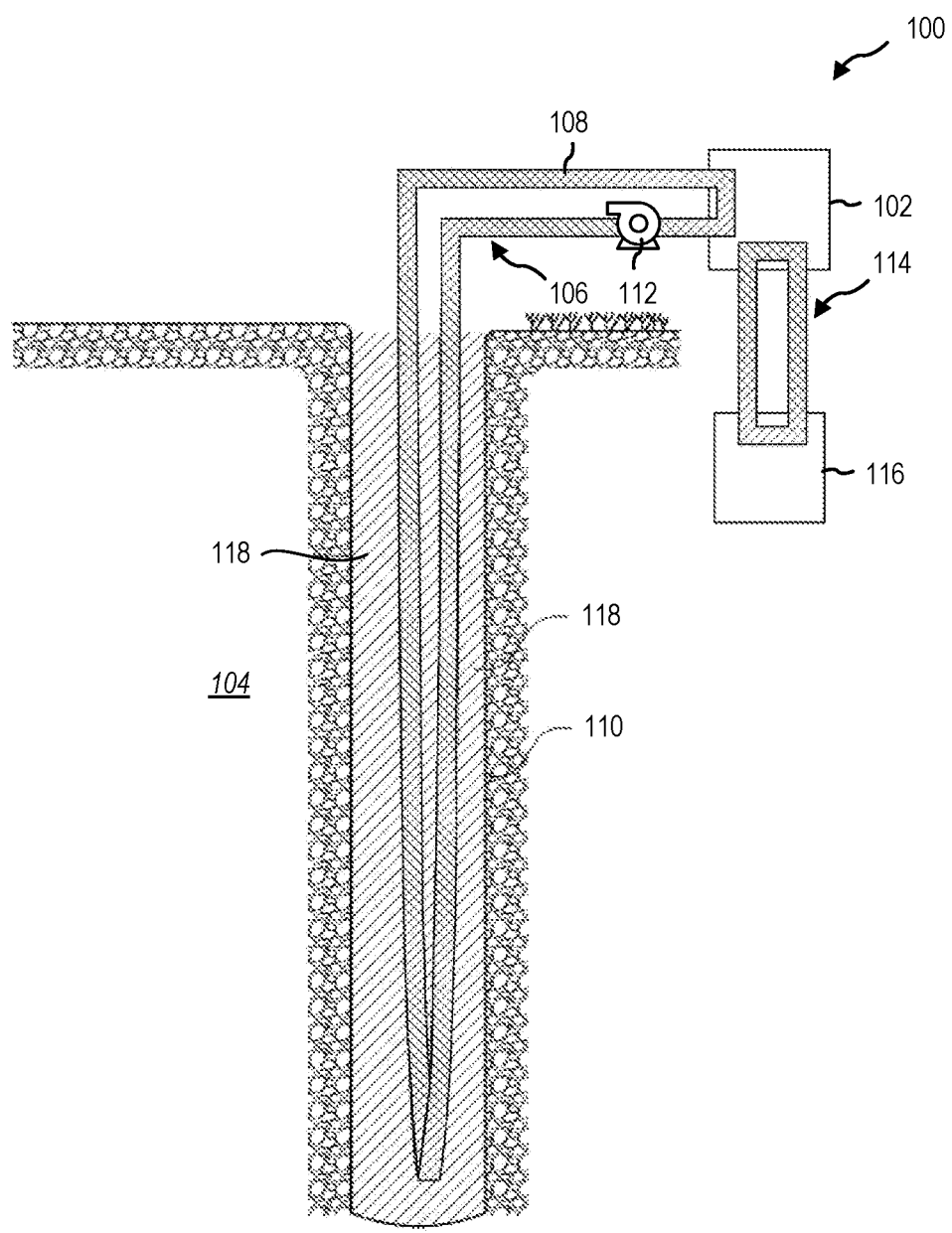
FIG. 1 is a simplified representation of a system including a geothermal heat pump for transferring thermal energy to and from an earth formation, according to at least one embodiment of the present disclosure.

As used herein, a "grout composition" means and includes a mixture (e.g., a blend) of one or more materials used to which water may be added to form a slurry, referred to herein as a "grout slurry." Upon hydrating and setting, the grout slurry forms a hardened water saturated material, which may be referred to herein as "grout" or a "set grout." The grout composition may also be referred to herein as a "dry grout composition."

This disclosure generally relates to devices, systems, and methods of using a ground source heat pump to facilitate heat transfer to and from an earth formation, such as in a shallow geothermal energy system. The ground source heat pump is operably coupled to a heat transfer loop comprising one or more pipes extending through a wellbore and into the surface of the earth formation. The one or more pipes may be sealed in place with grout located between the pipes and the earth formation. The grout may facilitate efficient thermal transfer (also referred to as "heat transfer") between the thermal transfer fluid and earth formation.

In use and operation, a thermal transfer fluid (a heat transfer fluid) is circulated from the ground source heat pump and through the heat transfer loop extending through the earth formation. Within the wellbore, thermal energy is transferred to or from the thermal transfer fluid to the earth formation (e.g., through the pipes, the grout, and to or from the earth formation). The heated or cooled thermal transfer fluid is circulated back to above the surface of the earth formation, where it is used to heat or cool a building (e.g., to heat or cool the air of the building). The building may be located proximate (e.g., collocated) with the wellbore.

To facilitate efficient heat transfer between the thermal transfer fluid in the heat transfer loop and the earth formation, the grout may be formulated and configured to exhibit a thermal conductivity substantially similar (e.g., the same as) the thermal conductivity of the earth formation. In addition, the grout may be formulated and configured to exhibit a compressive strength sufficient to withstand the weight of the system above the grout and the stresses to which the grout may be exposed. For example, the grout at the lower portion of the wellbore may exhibit a sufficient compressive strength to withstand the weight of the material above the grout (such as the weight of the overlying grout, the weight of the earth formation, and the weight of the pipes of the heat transfer loop and thermal transfer fluid in the pipes above the grout).

The grout may be formed by mixing a grout composition (a dry grout composition) with water to form a grout slurry. When set (e.g., dried), the grout slurry hardens and forms the grout. The grout and the grout composition may include a gypsum-based plaster. For example, the grout includes calcium sulfate. In some embodiments, the grout composition (e.g., the dry grout composition) comprises calcium hemihydrate ($CaSO_4 \cdot \frac{1}{2}H_2O$) (and may be referred to herein as plaster or "plaster of Paris"), and the grout comprises calcium sulfate dihydrate ($CaSO_4 \cdot 2H_2O$). The grout composition may include one or more additives formulated and configured to increase a thermal conductivity of the grout. In some embodiments, the grout composition and the grout includes graphite. In addition, the grout composition and the grout may include one or more retarders formulated and configured to slow (delay) the setting time of the grout slurry.

The thermal conductivity of the grout may be adjusted based, at least in part, on the concentration of the graphite in the grout and the grout composition. The thermal conductivity of the grout may be within a range of from about 1.0 W/m·K (about 0.58 BTU/hr·ft·° F.) to about 10.0 W/m·K (about 5.8 BTU/hr·ft·° F.). In addition, the compressive strength of the grout may be within a range of from about 345 kPa (about 50 psi) to about 3,450 kPa (about 500 psi). The grout may exhibit a modulus of elasticity and a Poisson's ratio such that the grout may be exposed to temperatures within a range of from about -7.0° C. (about 19.4° F.) to about 50° C. (about 122° F.) without cracking.

The grout slurry may exhibit a viscosity and a density suitable for pumping the grout slurry into the earth formation at depths greater than about 305 meters (about 1,000 feet). For example, the grout slurry may exhibit a viscosity less than about 1,000 cP and a density less than about 12.0 ppg at about 25° C. In some embodiments, the grout slurry may exhibit a viscosity at least about 10 times less than a viscosity of a slurry formed from bentonite rather than calcium sulfate, such as at least about 50 time less, or even at least about 100 times less than a slurry formed from bentonite. In some embodiments, the grout slurry exhibits a thickening time (also referred to as "pumping time") within a range of from about 1 hour to about 20 hours to reach 70 Bearden units (Bc) measured using a HPHT consistometer.

The grout slurry may exhibit a suitable density and viscosity for pumping, and the grout may exhibit a suitable thermal conductivity, compressive strength, elasticity, and flexibility for application in the shallow geothermal energy system. By way of comparison, materials formed from bentonite may exhibit a compressive strength at least about 50 times less the compressive strength of the grout disclosed herein. Materials comprising primarily bentonite may be formulated to have a higher thermal conductivity, however, at higher concentrations of graphite, such bentonite-based slurries may be unpumpable and exhibit a viscosity greater than about 1,000 cP at about 25° C., and may set to form a material having an insufficient compressive strength. In addition, materials formed from cement (e.g., Portland cement) may be subject to cracking and degradation responsive to exposure to temperature swings. By way of comparison, the grout formed according to embodiments of the disclosure may exhibit a flexibility and an elasticity such that it does not crack responsive to exposure to temperature swings to which the grout is exposed in a shallow geothermal energy system. The grout and the grout slurry described herein may be suitable for use in shallow geothermal energy systems and ground source heat pumps and may exhibit desired thermal conductivity, density, and elasticity. The calcium sulfate (e.g., calcium sulfate dihydrate) of the set grout may impart the compressive strength and the elasticity to the set grout, while the graphite imparts the thermal conductivity to the set grout. Grout slurries formed from the grout composition may be pumpable and exhibit a thickening time suitable for application in a downhole system (e.g., in a wellbore, such as in a wellbore of a shallow geothermal energy system; also referred to as a "shallow geothermal wellbore").

FIG. 1 is a simplified schematic representation of a system 100 including a geothermal heat pump 102 for transferring thermal energy to and from an earth formation 104, according to at least one embodiment of the present disclosure. The geothermal heat pump 102 may be in fluid communication with one or more geothermal heat transfer loops 106 (also referred to as "thermal transfer loops") including one or more pipes 108 (also referred to as "heat transfer pipes" or "thermal transfer pipes") in a wellbore 110 extending through the earth formation 104. In FIG. 1, the heat transfer loop 106 includes a single pipe 108 comprising a U-shaped pipe and comprises a closed-loop system. The pipe 108 may be formed of, for example, high density polyethylene (HDPE).

In FIG. 1, the heat transfer loop 106 and the pipe 108 are illustrated in a vertical orientation. However, in other embodiments, at least a portion of the heat transfer loop 106 and the pipes 108 may be horizontally oriented. In other embodiments, the system 100 comprises an open-loop system wherein, for example, water from the earth formation 104 is circulated to the geothermal heat pump 102 via a first (e.g., supply) pipe 108 and returned to the earth formation 104 in a second (e.g., return) pipe 108.

The geothermal heat pump 102 may be configured to circulate a thermal transfer fluid (e.g., propylene glycol) through the heat transfer loop 106. For example, the heat transfer loop 106 may be operably connected to a circulating pump 112 above the surface of the earth formation 104. As the thermal transfer fluid circulates through the heat transfer loop 106, the thermal transfer fluid exchanges heat with the earth formation 104 within the wellbore 110 and circulates back to the geothermal heat pump 102 where thermal energy is exchanged from the heat transfer loop 106 with another fluid (e.g., air) or another heat transfer loop 114, which is then used to heat or cool an external facility 116, such as a house or another building. The wellbore 110 may comprise a shallow geothermal wellbore.

The pipes 108 of the heat transfer loop 106 may be surrounded by grout 118. The grout 118 may provide structural support to the pipes 108 and to loops of pipes, to surface structures, and may prevent bore communication while drilling collocated wellbores, such as in wellbores in close proximity to one another. In addition, the grout 118 may improve thermal transfer between the thermal transfer fluid in the pipes 108 and the earth formation 104 compared to when the annular spaced between the pipes 108 and the earth formation 104 is filled with a gas, such as air.

In some embodiments, the grout 118 is formulated and configured to exhibit a thermal conductivity substantially similar to the thermal conductivity of the earth formation 104 (e.g., of the dirt and/or rock of the earth formation 104 through which the wellbore 110 and the heat transfer loop 106 extends). As described herein, a grout composition from which the grout 118 is formed may be formulated (e.g., tailored) based on the properties (e.g., the thermal conductivity) of the earth formation 104 in which the grout 118 will be placed. In addition, the grout 118 may exhibit improved compressive strength, density, elasticity, and flexibility compared to conventional grouts that include cement (e.g., Portland cement) and/or bentonite as a primary binder. Furthermore, the grout composition from which the grout 118 is formed may, when mixed with water to form a grout slurry, exhibit a suitable viscosity and density such that the grout slurry may be provided to the wellbore 110 at depths greater than 305 meters (about 1,000 feet). Further, the grout slurry may exhibit a thickening time sufficient that the grout slurry may be provided to the wellbore 110 without prematurely setting.

A thermal conductivity of the grout 118 may be within a range of from about 1.0 W/m·K (about 0.58 BTU/hr·ft·° F.) to about 10.0 W/m·K (about 5.78 BTU/hr·ft·° F.), such as from about 1.0 W/m·K (about 0.58 BTU/hr·ft·° F.) to about 1.5 W/m·K (about 0.87 BTU/hr·ft·° F.), from about 1.5 W/m·K (about 0.87 BTU/hr·ft·° F.) to about 2.0 W/m·K (about 1.16 BTU/hr·ft·° F.), from about 2.0 W/m·K (about 1.16 BTU/hr·ft·° F.) to about 2.5 W/m·K (about 1.45 BTU/hr·ft·° F.), from about 2.5 W/m·K (about 1.45 BTU/hr·ft·° F.) to about 3.0 W/m·K (about 1.73 BTU/hr·ft·° F.), from about 3.0 W/m·K (about 1.73 BTU/hr·ft·° F.) to about 4.0 W/m·K (about 2.31 BTU/hr·ft·° F.), from about 4.0 W/m·K (about 2.31 BTU/hr·ft·° F.) to about 5.0 W/m·K (about 2.89 BTU/hr·ft·° F.), from about 5.0 W/m·K (about 2.89 BTU/hr·ft·° F.) to about 6.0 W/m·K (about 3.47 BTU/hr·ft·° F.), from about 6.0 W/m·K (about 3.47 BTU/hr·ft·° F.) to about 8.0 W/m·K (about 4.63 BTU/hr·ft·° F.), or from about 8.0 W/m·K (about 4.63 BTU/hr·ft·° F.) to about 10.0 W/m·K (about 5.78 BTU/hr·ft·° F.). In some embodiments, the thermal conductivity of the grout 116 is within a range of from about 1.73 W/m·K (about 1.0 BTU/hr·ft·° F.) to about 5.19 W/m·K (about 3.0 BTU/hr·ft·° F.). In some embodiments, the thermal conductivity of the grout 118 is within a range of from about 3.46 W/m·K (about 2.0 BTU/hr·ft·° F.) to about 4.15 W/m·K (about 2.4 BTU/hr·ft·° F.), such as from about 3.81 W/m·K (about 2.2 BTU/hr·ft·° F.) to about 4.15 W/m·K (about 2.4 BTU/hr·ft·° F.). In some embodiments, the thermal conductivity of the grout 116 is greater than about 1.0 W/m·K (about 0.58 BTU/hr·ft·° F.).

A compressive strength of the grout 118 may be within a range of from about 345 kPa (about 50 psi) to about 3,450 kPA (about 500 psi), such as from about 345 kPa (about 50 psi) to about 500 kPa (about 72.5 psi), from about 500 kPa to about (about 72.5 psi) to about 1,000 kPa (about 145 psi), from about 1,000 kPa (about 145 psi) to about 2,000 kPa (about 290 psi), or from about 2,000 kPa (about 290 psi) to about 3,450 kPA (about 500 psi). In some embodiments, the compressive strength of the grout 118 is greater than about 345 kPa (about 50 psi), such as greater than about 689 kPa (about 100 psi).

The grout 118 may be configured to withstand exposure to different temperatures and variations in temperature (e.g., temperature swings) without cracking. In some embodiments, the grout 118 exhibits a Poisson's ratio within a range of from about 0.15 to about 0.30, such as from about 0.15 to about 0.18, from about 0.18 to about 0.21, from about 0.21 to about 0.24, from about 0.24 to about 0.27, or from about 0.27 to about 0.30 when tested according to ASTM C469 standard. In some embodiments, the grout 118 exhibits a Poisson's ratio greater than that of cement or of a bentonite-based grout. A modulus of elasticity of the grout 118 may be within a range of from about 2.0 GPa to about 8.0 GPa, such as from about 2.0 GPa to about 3.0 GPa, from about 3.0 GPa to about 4.0 GPa, from about 4.0 GPa to about 6.0 GPa, or from about 6.0 GPa to about 8.0 GPa.

The grout 118 may have a solid volume fraction (SVF) within a range of from about 30% to about 50%, such as from about 30% to about 40%, or from about 40% to about 50%. A density of the grout 118 may be within a range of from about 9.5 pounds per gallon (ppg) (about 1,138 kg/m$^3$) to about 12.0 ppg (about 1,438 kg/m$^3$), such as from about 9.5 pounds per gallon (ppg) (about 1,138 kg/m$^3$) to about 10.0 pounds ppg (about 1,198 kg/m$^3$) to about 10.5 ppg (about 1,258 kg/m$^3$), from about 10.5 ppg (about 1,258 kg/m$^3$) to about 11.0 ppg (about 1,318 kg/m$^3$), from about 11.0 ppg (about 1,318 kg/m$^3$) to about 11.5 ppg (about 1,378 kg/m$^3$), or from about 11.5 ppg (about 1,378 kg/m$^3$) to about 12.0 ppg (about 1,438 kg/m$^3$).

The grout 118 may be suitable for applications in shallow wellbores, such as in shallow geothermal energy systems. For example, the grout 118 provide an environmental seal and may have a permeability less than about $1 \times 10^{-7}$ cm/s tested under ASTM D-5084 standard. The grout 118 may further be configured to have a thermal conductivity within the ranges described above and measured according to ASTM D-5334 standard. In addition, the grout 118 may meet NSF/ANSI Standard 60 requirements for purity and suitability for contact with drinking water.

While the system 100 has been described and illustrated as including one wellbore 110, the disclosure is not so limited. In other embodiments, the system 100 includes multiple wellbores 110 collocated within a region, each extending into the earth formation 104. The wellbores 110 may be spaced from one another a sufficient distance to facilitate heat transfer to and from heat transfer loops 106 associated with each wellbore 110 without negatively affecting a rate of heat transfer from neighboring heat transfer loops 106 of neighboring wellbores 110.

While the grout 118 has been described and illustrated in use in a system 100 including the geothermal heat pump 102 and the heat transfer loop 106 in a ground source heat recovery system, the disclosure is not so limited. In other embodiments, the grout 118 may be used in a geothermal well.

Figure 2:
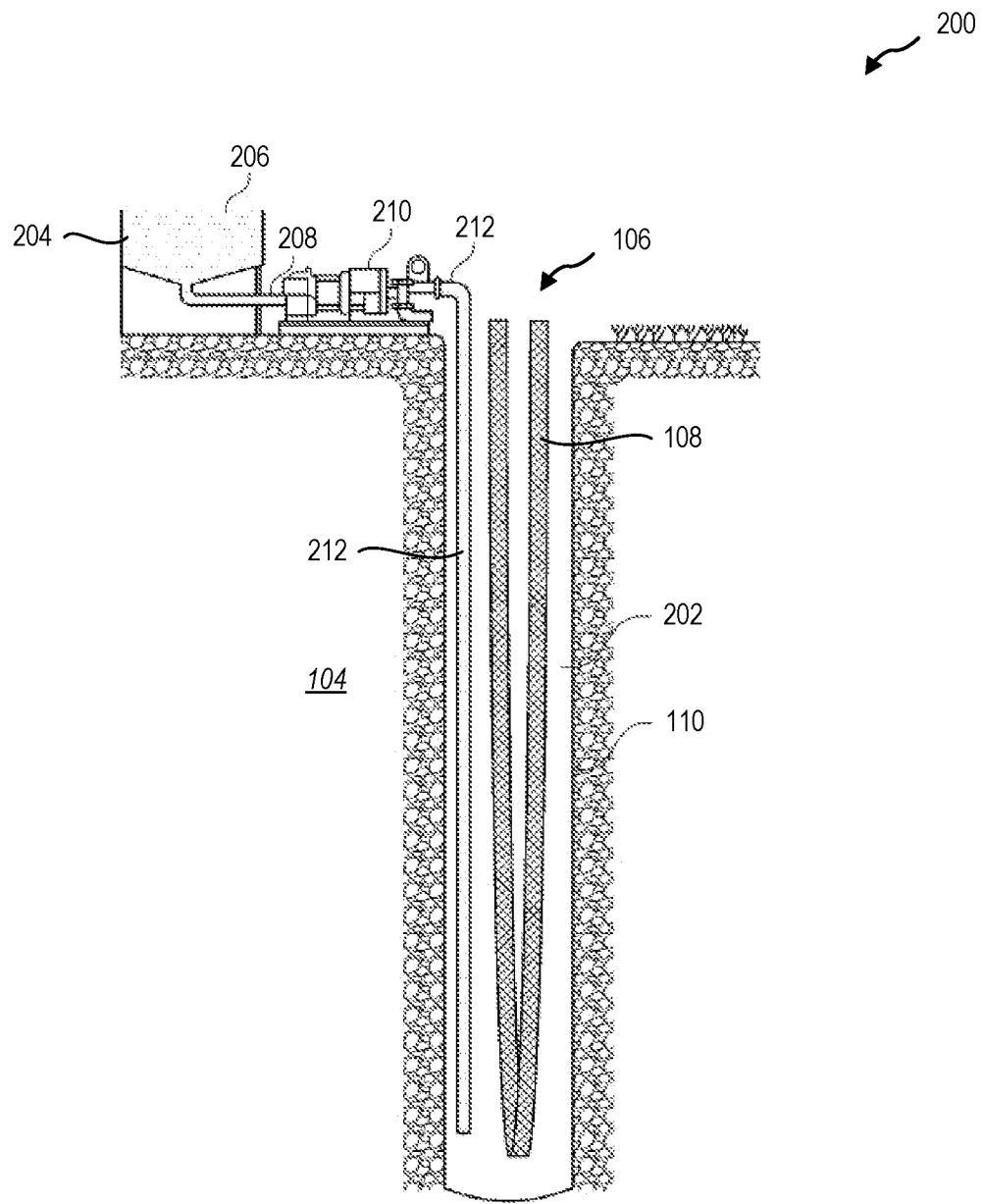
FIG. 2 is a simplified schematic representation of a system for installing a heat transfer loop including a thermal transfer pipe in a wellbore and providing grout between the thermal transfer pipe and surfaces of the wellbore, according to at least one embodiment of the disclosure.

FIG. 2 is a simplified schematic representation of a system 200 for installing the heat transfer loop 106 including the pipe 108 in the wellbore 110 and providing grout 118 (FIG. 1) in an annulus 202 between the pipe 108 and the surfaces of the earth formation 104 defining the wellbore 110. The system 200 includes a mixing tank 206 in which a grout composition may be mixed with water to form a grout slurry 204. The system 200 may be configured to facilitate automated mixing of the water and the grout to form the grout slurry 204 having desired properties (e.g., a desired viscosity, density, composition, etc.). The grout slurry 204 may be provided to the wellbore 110 to fill the annulus 202 with the grout slurry 204 and form the grout 118 (FIG. 1). The grout slurry 204 may be conveyed via a grout pipe 208 to a pump 210, and from the pump 210 to a tremie line 212 extending into the wellbore 110. The tremie line 212 extends into the annulus 202 between the thermal transfer pipe 108 and the surfaces of the earth formation 104 defining the wellbore 110. In some embodiments, as the grout slurry 204 is provided to the annulus 202, tremie line 212 is pulled from the annulus 202 and maintained above the level of the grout slurry 204 filling the volume between the pipe 108 and the earth formation 104. In some embodiments, a pressure may be applied to the pipe 108 to prevent the pipe 108 from collapsing at deeper depths within the wellbore 110 and maintain the integrity of the pipe 108. When the grout slurry 204 sets, the pressure in the pipe 108 may be released since the hydrostatic pressure of the grout may be reduced to about 0 once the grout slurry 204 sets to form the grout 116.

The ends of the thermal transfer pipe 108 may be connected to a circulating pump (e.g., circulating pump 112 (FIG. 1)) and to additional pipes to operably coupled the thermal transfer pipe 108 to an external facility 116 (FIG. 1).

As described above, the grout 118 may be formed by mixing a grout composition with water to form the grout slurry 204. The grout composition may include a binder, at least one thermal conductivity additive, and at least one retarder. The grout composition may include one or more additional additives.

The binder may include comprising calcium sulfate, such as one or both of calcium sulfate hemihydrate ($CaSO_4 \cdot \frac{1}{2}H_2O$) or anhydrite. In some embodiments, the binder comprises calcium sulfate hemihydrate.

The binder may constitute from about 25.0 weight percent to about 99.0 weight percent of the grout composition, such as from about 25.0 weight percent to about 30.0 weight percent, from about 30.0 weight percent to about 40.0 weight percent, from about 40.0 weight percent to about 50.0 weight percent, from about 50.0 weight percent to about 60.0 weight percent, from about 60.0 weight percent to about 70.0 weight percent, from about 70.0 weight percent to about 75.0 weight percent, from about 75.0 weight percent to about 80.0 weight percent, from about 80.0 weight percent to about 85.0 weight percent, from about 85.0 weight percent to about 90.0 weight percent, from about 90.0 weight percent to about 92.0 weight percent, from about 92.0 weight percent to about 94.0 weight percent, from about 94.0 weight percent to about 96.0 weight percent, from about 96.0 weight percent to about 98.0 weight percent, from about 98.0 weight percent to about 98.5 weight percent, or from about 98.5 weight percent to about 99.0 weight percent of the grout composition.

In some embodiments, the binder constitutes greater than about (at least about) 25.0 weight percent of the grout composition, such as greater than about 40.0 weight percent, greater than about 50.0 weight percent, greater than about 60.0 weight percent, greater than about 70.0 weight percent, greater than about 80.0 weight percent of the grout composition, such as greater than about 85.0 weight percent, greater than about 90.0 weight percent, or greater than about 95.0 weight percent of the grout composition.

An average particle size of the binder may be within a range of from about 1.0 μm to about 1,000 μm, such as from about 1.0 μm to about 20.0 μm, from about 20.0 μm to about 50.0 μm, from about 50.0 μm to about 100 μm, from about 100 μm about 200 μm, from about 200 μm to about 300 μm, from about 300 μm to about 500 μm, from about 500 μm to about 750 μm, or from about 750 μm to about 1,000 μm. The binder may exhibit a unimodal particle size distribution or a polymodal (e.g., a bimodal) particle size distribution. In some embodiments, the binder exhibits a unimodal particle size distribution.

The at least one thermal conductivity additive may include graphite. An average particle size of the graphite may be within a range of from 1.0 μm to about 1,000 μm, such as from about 1.0 μm to about 20.0 μm, from about 20.0 μm to about 50.0 μm, from about 50.0 μm to about 100 μm, from about 100 μm about 200 μm, from about 200 μm to about 300 μm, from about 300 μm to about 500 μm, from about 500 μm to about 750 μm, or from about 750 μm to about 1,000 μm. In some embodiments, the average particle size of the graphite is about the same as the average particle size of the binder.

In some embodiments, the at least one thermal conductivity additive exhibits a unimodal particle size distribution. In other embodiments, the at least one thermal conductivity additive exhibits a polymodal (e.g., bimodal) particle size distribution.

The at least one thermal conductivity additive may have a spherical shape, a platelet shape, a flake shape, a rodlet shape, a cylindrical shape, a cuboidal shape, or another shape. In some embodiments, the at least one thermal conductivity additive has a spherical shape. In some embodiments, at least some of the thermal conductivity additive has a first shape (e.g., spherical), and at least some of the thermal conductivity additive have a second, different shape (e.g., platelet or rodlet).

In some embodiments, the at least one thermal conductivity additive comprises graphite and at least one additional thermal conductivity additive. The at least one additional thermal conductivity additive may include one or more of graphene, silicon carbide, aluminum oxide, hematite, copper (copper metal), copper oxide, aluminum, amorphous carbon, gallium, iron, magnesium oxide, nickel, nickel oxide, tin, tin oxide, zin, or zinc oxide.

The at least one thermal conductivity additive may be present in the grout composition at a weight percent to impact a desired thermal conductivity to the grout. The at least one thermal conductivity additive may constitute from about 0.1 weight percent to about 75.0 weight percent of the grout composition, such as from about 0.1 weight percent to about 0.2 weight percent, from about 0.2 weight percent to about 0.5 weight percent, from about 0.5 weight percent to about 1.0 weight percent, from about 1.0 weight percent to about 2.0 weight percent, from about 2.0 weight percent to about 3.0 weight percent, from about 3.0 weight percent to about 5.0 weight percent, from about 5.0 weight percent to about 10.0 weight percent, from about 10.0 weight percent to about 15.0 weight percent, from about 15.0 weight percent to about 20.0 weight percent, from about 20.0 weight percent to about 25.0 weight percent, from about 25.0 weight percent to about 30.0 weight percent, from about 30.0 weight percent to about 35.0 weight percent, from about 35.0 weight percent to about 40.0 weight percent, from about 40.0 weight percent to about 45.0 weight percent, from about 45.0 weight percent to about 50.0 weight percent, from about 50.0 weight percent to about 55.0 weight percent, from about 55.0 weight percent to about 65.0 weight percent, or from about 65.0 weight percent to about 75.0 weight percent of the grout composition. The at least one thermal conductivity additive may constitute greater than about 0.2 weight percent, such as greater than about 0.5 weight percent, greater than about 1.0 weight percent, greater than about 2.0 weight percent, greater than about 3.0 weight percent, greater than about 5.0 weight percent, greater than about 10.0 weight percent, greater than about 20.0 weight percent, greater than about 30.0 weight percent, greater than about 35.0 weight percent, greater than about 45.0 weight percent, greater than about 55.0 weight percent, or even greater than about 65.0 weight percent of the grout composition.

A weight ratio of the binder to the at least one thermal conductivity additive in the grout composition may be within a range of from about 0.033:1.0 to about 5.0:1.0, such as from about 0.33:1.0 to about 0.5:1.0, from about 0.5:1.0 to about 1.0:1.0, from about 1.0:1.0 to about 2.0:1.0, from about 2.0:1.0 to about 3.0:1.0, from about 3.0:1.0 to about 4.0:1.0, or from about 4.0:1.0 to about 5.0:1.0. In some embodiments, the weight ratio of the binder to the at least one thermal conductivity additive is within a range of from about 1.5:1.0 to about 2.5:1.0, such as about 2.0:1.0. In some embodiments, the grout composition comprises a greater weight percent of the binder than of the at least one thermal conductivity additive.

The at least one retarder may include one or more of borax ($Na_2[B_4O_5(OH)_4] \cdot 8H_2O$) (also referred to as sodium borate, sodium tetraborate, or disodium tetraborate), ethylenediamine tetra(methylene phosphonic acid) ($C_6H_{20}N_2O_{12}P_4$) (EDTMP), a lignosulfonate, a hydroxycarboxylic acid (e.g., citric acid, tartaric acid, gluconic acid, glucoheptonate, glucono-delta-lactone), an organophospate (e.g., maleic anhydride, or 2-arcylamido-2-methylpropansulfonic acid (AMPS) copolymers. In some embodiments, the at least one retarder comprises one or both of borax and EDTMP. The EDTMP may comprise, for example, a sodium or calcium salt EDTMP.

The at least one retarder may constitute from about 0.02 weight percent to about 4.0 weight percent of the grout composition, such as from about 0.02 weight percent to about 0.05 weight percent, from about 0.05 weight percent to about 0.10 weight percent, from about 0.10 weight percent to about 0.20 weight percent, from about 0.20 weight percent to about 0.40 weight percent, from about 0.40 weight percent to about 0.60 weight percent, from about 0.60 weight percent to about 0.80 weight percent, from about 0.80 weight percent to about 1.0 weight percent, from about 1.0 weight percent to about 1.5 weight percent, from about 1.5 weight percent to about 2.0 weight percent, from about 2.0 weight percent to about 2.5 weight percent, from about 2.5 weight percent to about 3.0 weight percent, from about 3.0 weight percent to about 3.5 weight percent, or from about 3.5 weight percent to about 4.0 weight percent of the grout composition.

The retarder may be present in the grout composition to facilitate increasing a setting time of a grout slurry 204 when the grout composition is mixed with water. By way of non-limiting example, the retarder may be present in the grout composition to increase the setting time of the grout slurry 204 to at least about 2.0 hours, such as at least about 2.5 hours, or at least about 3.0 hours. However, the disclosure is not so limited, and the retarder may increase the setting time of the grout slurry 204 by a different amount.

In some embodiments, a ratio of the borax to the EDTMP in the at least one retarder is within a range of from about 1.0:1.0 to about 15.0:1.0, such as from about 1.0:1.0 to about 3.0:1.0, from about 3.0:1.0 to about 6.0:1.0, from about 6.0:1.0 to about 8.0:1.0, from about 8.0:1.0 to about 10.0:1.0, from about 10.0:1.0 to about 12.0:1.0, or from about 12.0:1.0 to about 15.0:1.0. In some embodiments, the ratio of the borax to the EDTMP is about 9.0:1.0. In other embodiments, the retarder includes only borax (e.g., does not include EDTMP).

In some embodiments, in addition to the calcium sulfate (e.g., the calcium sulfate hemihydrate), the grout composition may include one or more additional binders. The one or more additional binders may include one or more of bentonite, cement, Portland cement, pozzolan, slag, tricalcium silicate, dicalcium silicate, tricalcium aluminuate, calcium aluminferrite, silica, dolomite, diatomaceous earth, wellan, xanthan, guar, hydroxyethyl cellulose (HEC) binders, or other binders. In some embodiments, the grout composition comprises calcium sulfate and bentonite. In some embodiments, the grout composition comprises a greater weight percent of calcium sulfate than of other components (e.g., of the one or more additional binders, of the at least one thermal conductivity additive, of the at least one retarder).

The grout composition may include one or more additional additives. By way of non-limiting example, the grout composition may include one or more defoamers, foaming surfactants, fluid loss agents, weighting materials, dispersants, fillers, hollow glass or ceramic beads, or other additives.

In use and operation, the grout composition may be mixed with water to form a grout slurry 204 that, when set, forms the grout 118. A weight percent of water in the grout slurry 204 may be within a range of from about 30 weight percent to about 90 weight percent, such as from about 30 weight percent to about 40 weight percent, from about 40 weight percent to about 50 weight percent, from about 50 weight percent to about 60 weight percent, from about 60 weight percent to about 70 weight percent, from about 70 weight percent to about 80 weight percent, or from about 80 weight percent to about 90 weight percent, based on a total weight of the entire grout slurry 204. In some embodiments, the water constitutes from about 75 weight percent to about 85 weight percent of the grout slurry 204, based on the entire weight of the entire grout slurry 204. In some embodiments, a weight percent of water in the grout slurry is about 52 weight percent.

A density of the grout slurry 204 may be within a range of from about 1,050 kg/m$^3$ (about 8.76 ppg) to about 1,450 kg/m$^3$ (about 12.10 ppg), such as from about 1,050 kg/m$^3$ (about 8.76 ppg) to about 1,100 kg/m$^3$ (about 9.18 ppg), from about 1,100 kg/m$^3$ (about 9.18 ppg) to about 1,150 kg/m$^3$ (about 9.60 ppg), from about 1,150 kg/m$^3$ (about 9.60 ppg) to about 1,200 kg/m$^3$ (about 10.01 ppg), from about 1,200 kg/m$^3$ (about 10.01 ppg) to about 1,250 kg/m$^3$ (about 10.43 ppg), from about 1,250 kg/m$^3$ (about 10.43 ppg) to about 1,300 kg/m$^3$ (about 10.85 ppg), from about 1,300 kg/m$^3$ (about 10.85 ppg) to about 1,350 kg/m$^3$ (about 11.27 ppg), from about 1,350 kg/m$^3$ (about 11.27 ppg) to about 1,400 kg/m$^3$ (about 11.68 ppg), or from about 1,400 kg/m$^3$ (about 11.68 ppg) to about 1,450 kg/m$^3$ (about 12.10 ppg).

In some embodiments, the density of the grout slurry 204 is within a range of from about 1,375 kg/m³ (about 11.5 ppg) to about 1,440 kg/m³ (about 12.0 ppg), such as about 1,410 kg/m³ (about 11.8 ppg). In some embodiments, the grout slurry 204 has a density less than about 1,440 kg/m³ (about 12.0 ppg), such as less than about 1,410 kg/m³ (about 11.8 ppg), less than about 1,375 kg/m³ (about 11.5 ppg), or less than about 1,300 kg/m³ (about 10.85 ppg).

A weight percent of each of the binder, the at least one thermal conductivity additive, and the retarder in the grout slurry 204 may be the same as described above with reference to the grout composition absent the water in the grout slurry 204 (e.g., not including the water; based on the composition of the grout slurry 204 not including the water).

In some embodiments, the density of the grout slurry 204 is less than the density of grout slurries formed from or otherwise comprising cement, such as Portland cement, which may be at least about 13.0 ppg, such as at least about 14.0 ppg, or even 15.0 ppg. The relatively lower density of the grout slurry 204 may facilitate the efficient pumping of the grout slurry 204 and placement in the wellbore 110 without damaging (e.g., collapsing) the pipe 108 of the heat transfer loops 106. In addition, because the grout slurry 204 is formed from calcium sulfate (e.g., calcium sulfate dihydrate), the grout 118 formed from the grout slurry 204 when set may exhibit a compressive strength greater than a compressive strength of grout formed from bentonite and without plaster and having a similar density. For example, the compressive strength of the grout 118 may be at least about 50 times, such as at least about 75 times, or even at least about 100 times the compressive strength of grouts formed from bentonite.

The grout slurry 204 may exhibit a pumpability and a mixability as determined under API RP 1-B-2 standards. For example, the grout slurry 204 may exhibit a mixability having a reading of less than about 300 measured using a Couette viscometer equipped with a R1B1F1 rotor: bob: spring configuration at a rotation speed of 300 rpm (equivalent to a shear rate of 511 sec$^{-1}$.

The grout slurry 204 may exhibit a pumpability suitable for providing the grout slurry 204 downhole in the wellbore 110, such as through the tremie line 212 to form the grout 118. The grout slurry 204 may exhibit a thickening time to 70 Bc (Bearden units) measured using a HPHT consistometer ranging from at least 1 hour to about 20 hours, such as from about 1 hour to about 2 hours, from about 2 hours to about 5 hours, from about 5 hours to about 10 hours, or from about 10 hours to about 20 hours.

A plastic viscosity (as defined by the Bingham rheology model (e.g., measured with a Couette viscometer)) of the grout slurry 204 may be within a range of from about 10 cP to about 1,000 cP, such as from about 10 cP to about 50 cP, from about 50 cP to about 100 cP, from about 100 cP to about 250 cP, from about 250 cP to about 500 cP, from about 500 cP to about 750 cP, or from about 750 cP to about 1,000 cP at about 25° C. In some embodiments, the viscosity of the grout slurry 204 is less than about 1,000 cP at about 25° C.

When set, the grout 118 may comprise substantially the same material composition (and weight percents of constituents) as the grout, except that the binder of the grout composition and the grout slurry will be hydrated. For example, the calcium sulfate hemihydrate may be hydrated and comprise calcium sulfate dihydrate I the set grout 118. The grout 118 may include, for example, calcium sulfate dihydrate, the at least one thermal conductivity additive, the at least one retarder, and one or more additional binders and/or one or more additional additives (if present in the dry grout composition).

For example, the grout 118 may comprise from about 25 weight percent to about 99 weight percent of the calcium sulfate dihydrate (corresponding to the weight percent of the binder (e.g., calcium sulfate hemihydrate) and the water in the grout slurry 240. By way of non-limiting example, calcium sulfate dihydrate may constitute from about 50 weight percent to about 99 weight percent of the grout 118, such as from about 50 weight percent to about 60 weight percent, from about 60 weight percent to about 70 weight percent, from about 70 weight percent to about 80 weight percent, from about 80 weight percent to about 90 weight percent, or from about 90 weight percent to about 99 weight percent of the grout 118. The binder may constitute at least about 20.0 weight percent of the grout 116, such as at least about 30.0 weight percent, at least about 40.0 weight percent, at least about 50.0 weight percent, at least about 60.0 weight percent of the grout 116, at least about 70.0 weight percent, at least about 80.0 weight percent, or at least about 90.0 weight percent of the grout 116.

The at least one thermal conductivity additive may constitute from about 0.1 weight percent to about 60 weight percent of the grout 118, such as from about 0.1 weight percent to about 1.0 weight percent, from about 1.0 weight percent to about 5.0 weight percent, from about 5.0 weight percent to about 10.0 weight percent, from about 10.0 weight percent to about 20.0 weight percent, from about 20.0 weight percent to about 30.0 weight percent, from about 30.0 weight percent to about 40.0 weight percent, from about 40.0 weight percent to about 50.0 weight percent, or from about 50.0 weight percent to about 60.0 weight percent of the grout 118. The at least one thermal conductivity additive may constitute at least about 5.0 weight percent of the grout 116, such as at least about 10.0 weight percent, at least about 20.0 weight percent, at least about 30.0 weight percent, at least about 40.0 weight percent, at least about 50.0 weight percent, or even at least about 60.0 weight percent of the grout 116.

The retarder may constitute from about 0.01 weight percent to about 2.0 weight percent of the grout 118, such as from about 0.01 weight percent to about 0.10 weight percent, from about 0.10 weight percent to about 0.20 weight percent, from about 0.20 weight percent to about 0.50 weight percent, from about 0.50 weight percent to about 1.0 weight percent, from about 1.0 weight percent to about 1.5 weight percent, or from about 1.5 weight percent to about 2.0 weight percent of the grout 116.

The grout 118, grout composition, and the grout slurry 204 may exhibit beneficial properties for application in a ground source heat pump and/or a shallow geothermal energy system. For example, the grout slurry 204 may exhibit a viscosity and density such that the grout slurry 204 may be pumped to downhole locations to form the grout 118 without damaging the pipe 108. In addition, the grout slurry 204 may exhibit a thickening time such that the grout slurry 204 may be provided to the wellbore 110 without prematurely setting. The grout 118 may exhibit a suitable thermal conductivity and compressive strength for application in the system 100. In addition, the grout 118 may exhibit a modulus of elasticity and a flexibility such that the grout 118 may withstand temperatures and temperature changes that the grout 118 may be exposed to in the system 100 without cracking.

Figure 3:
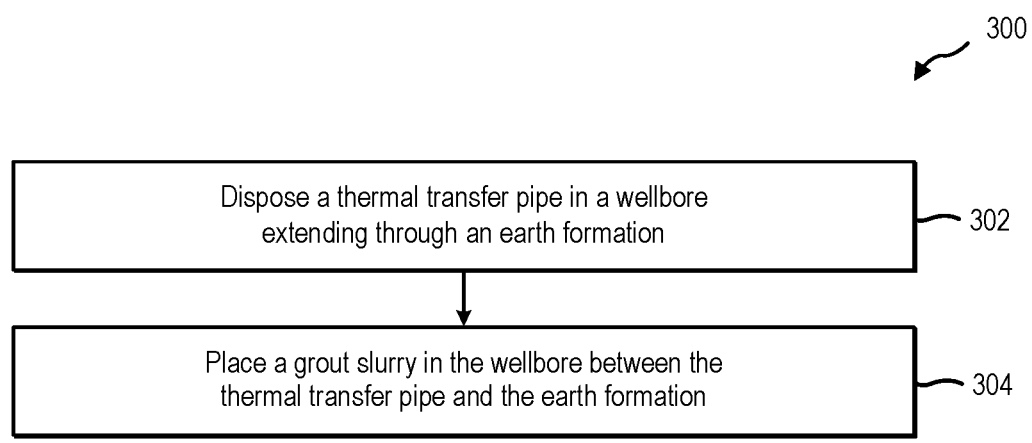
FIG. 3 is a simplified flow diagram illustrating a method of grouting a wellbore, according to at least one embodiment of the disclosure.

FIG. 3 is a simplified flow diagram illustrating a method 300 of operating forming a shallow geothermal energy system including a wellbore, according to at least one embodiment of the disclosure. The method 300 includes disposing a thermal transfer pipe in a wellbore extending through an earth formation, as shown in act 302. The thermal transfer pipe may be the same as the pipe 106.

The method 300 may further include placing a grout slurry in the wellbore between the thermal transfer pipe and the earth formation, as shown in act 304. For example, the grout slurry may be placed in the wellbore and substantially surround the thermal transfer pipe, as described above with reference to FIG. 1. The grout slurry may comprise substantially the same material composition as the grout slurry described above. The method 300 may further include allowing the grout slurry to set to form the grout 118 described above with reference to FIG. 1.

The embodiments of the grout composition, the grout slurry, and the grout have been primarily described with reference to wellbore grouting operations (e.g., placement of thermal transfer pipes in a shallow geothermal wellbore); the grout composition, the grout slurry, and the grout described herein may be used in applications other than grouting a shallow geothermal wellbore. In other embodiments, the grout composition, the grout slurry, and the grout according to the present disclosure may be used outside a wellbore or other downhole environment used for the exploration or production of natural resources. For instance, the grout composition, the grout slurry, and the grout of the present disclosure may be used in a borehole used for placement of utility lines. Accordingly, the terms "wellbore," "borehole," and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A grout composition, comprising:
    a grout binder comprising calcium sulfate, the grout binder constituting from about 25.0 weight percent to about 99.0 weight percent of the grout composition;
    at least one thermal conductivity additive comprising graphite; and
    at least one retarder comprising borax and ethylenediamine tetra(methylene phosphonic acid), wherein a ratio of borax to ethylenediamine tetra(methylene phosphonic acid) in the at least one retarder is within a range of from about 5.0:1.0 to about 10.0:1.0.

2. The grout composition of claim 1, wherein the calcium sulfate comprises calcium sulfate hemihydrate.

3. The grout composition of claim 1, wherein the calcium sulfate constitutes at least about 60.0 weight percent of the grout composition.

4. The grout composition of claim 1, wherein a weight percent of the graphite in the grout composition is within a range of from about 0.1 weight percent to about 75.0 weight percent.

5. The grout composition of claim 1, wherein the graphite constitutes greater than about 30.0 weight percent of the grout composition.

6. The grout composition of claim 1, wherein the grout binder further comprises at least one of bentonite or sand.

7. The grout composition of claim 1, wherein the grout composition is formulated and configured to, when mixed with water to form a grout, forms a grout exhibiting a modulus of elasticity within a range of from about 2.0 GPa to about 8.0 GPa.

8. The grout composition of claim 1, wherein a ratio of the calcium sulfate to the graphite is within a range of from about 1.5:1.0 to about 2.5:1.0.

9. A grout slurry composition, comprising:
water;
at least one grout binder comprising at least about 50 weight percent calcium sulfate;
at least one thermal conductivity additive comprising graphite, wherein the grout slurry composition has a density within a range of from about 1,050 kg/m$^3$ to about 1,450 kg/m$^3$ and a viscosity within a range of from about 10 cP to about 1,000 cP at about 25° C.; and
at least one retarder comprising borax and ethylenediamine tetra(methylene phosphonic acid), wherein the at least one retarder is within a range of from about 0.01 weight percent to about 4.0 weight percent based on the grout slurry composition not including the water.

10. The grout slurry of claim 9, wherein a density of the grout slurry is within a range of from about 1,375 kg/m$^3$ to about 1,440 kg/m$^3$.

11. The grout slurry of claim 9, wherein a thermal conductivity of a grout formed from the grout slurry is within a range of from about 1.73 W/m·K (about 1.0 BTU/hr·ft·° F.) to about 5.19 W/m·K (about 3.0 BTU/hr·ft·° F.).

12. The grout slurry of claim 9, wherein a weight percent of the graphite not including the water is within a range of from about 10.0 weight percent to about 20.0 weight percent.

13. The grout slurry of claim 9, wherein the calcium sulfate comprises calcium sulfate hemihydrate.

14. A method of grouting a shallow geothermal wellbore, the method comprising:
pumping a grout slurry in a wellbore extending through an earth formation between surfaces of the earth formation defining the wellbore and a thermal transfer pipe, the grout slurry having a density within a range of from about 1,050 kg/m$^3$ to about 1,450 kg/m$^3$ and comprising:
water;
at least about 25.0 weight percent calcium sulfate hemihydrate based on the grout slurry composition not including the water; and
at least about 10.0 weight percent graphite based on the grout slurry composition not including the water;
at least one retarder comprising borax and ethylenediamine tetra(methylene phosphonic acid), wherein a ratio of borax to ethylenediamine tetra(methylene phosphonic acid) in the at least one retarder is within a range of from about 5.0:1.0 to about 10.0:1.0; and
setting the grout slurry to form a grout having a thermal conductivity within a range of from about 1.0 W/m·K to about 10.0 W/m·K.

15. The method of claim 14, wherein pumping a grout slurry in a wellbore comprises pumping a grout slurry comprising at least about 70.0 weight percent based on the grout slurry composition not including the water calcium sulfate hemihydrate in the wellbore.

* * * * *